US008356211B2

(12) United States Patent
Benedek et al.

(10) Patent No.: US 8,356,211 B2
(45) Date of Patent: *Jan. 15, 2013

(54) DETECTING BROWSER FAILURE

(75) Inventors: Joseph E. Benedek, Issaquah, WA (US); Roberto A. Franco, Seattle, WA (US); Quji Guo, Stanford, CA (US); J. Craig Hally, Sammamish, WA (US); Reid T. Holmes, Vancouver, CA (US); Roman Pamucci, Bellevue, WA (US); Edward J. Praitis, Woodinville, WA (US); Christopher T. Sager, Bellevue, WA (US); Brian D. Wentz, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/365,990

(22) Filed: Feb. 3, 2012

(65) Prior Publication Data

US 2012/0137183 A1 May 31, 2012

Related U.S. Application Data

(63) Continuation of application No. 12/133,337, filed on Jun. 4, 2008, now Pat. No. 8,112,673, which is a continuation of application No. 10/814,591, filed on Mar. 31, 2004, now Pat. No. 7,398,433.

(51) Int. Cl.
*G06F 11/00* (2006.01)
(52) U.S. Cl. ...................................... 714/38.11; 717/170
(58) Field of Classification Search ........................ None
See application file for complete search history.

(56) References Cited

U.S. PATENT DOCUMENTS

| 5,553,235 | A | | 9/1996 | Chen et al. |
|---|---|---|---|---|
| 5,903,728 | A | * | 5/1999 | Semenzato ................... 709/217 |
| 6,148,336 | A | | 11/2000 | Thomas et al. |
| 6,151,569 | A | * | 11/2000 | Elliott ............................ 703/22 |
| 6,170,065 | B1 | * | 1/2001 | Kobata et al. ............... 714/38.14 |
| 6,353,926 | B1 | * | 3/2002 | Parthesarathy et al. ........ 717/170 |
| 6,591,379 | B1 | | 7/2003 | LeVine et al. |
| 6,629,267 | B1 | * | 9/2003 | Glerum et al. ............. 714/38.11 |
| 6,651,084 | B1 | * | 11/2003 | Kelley et al. ................... 709/202 |
| 6,681,344 | B1 | * | 1/2004 | Andrew ..................... 714/38.14 |
| 6,738,932 | B1 | | 5/2004 | Price |
| 6,950,990 | B2 | * | 9/2005 | Rajarajan et al. ............. 715/736 |
| 7,039,833 | B2 | * | 5/2006 | Knuutila et al. ............... 714/38.1 |
| 7,769,895 | B1 | * | 8/2010 | Williams et al. ............... 709/246 |
| 2003/0051027 | A1 | * | 3/2003 | Aupperle et al. ............. 709/224 |
| 2003/0110482 | A1 | | 6/2003 | Ferguson et al. |

(Continued)

OTHER PUBLICATIONS pinder and Marshall, "Enable/Disable Flash", Nov. 2002, Deftone/Blogzilla.*

(Continued)

*Primary Examiner* — Gabriel Chu
(74) *Attorney, Agent, or Firm* — Wolfe-SBMC

(57) ABSTRACT

Embodiments are configured to improve the stability of a Web browser by identifying plug-in modules that cause failures. Data in memory at the time of a failure is analyzed, and a failure signature is generated. The failure signature is compared to a database of known failure signatures so that the source of the failure may be identified. If a plug-in module to a Web browser is identified as the source of a failure, options are presented to the user who may update the plug-in module with code that does not produce a failure or disable the plug-in module altogether.

17 Claims, 5 Drawing Sheets

U.S. PATENT DOCUMENTS

| | | | |
|---|---|---|---|
| 2004/0078686 A1 | 4/2004 | Toyooka et al. | |
| 2004/0078689 A1 | 4/2004 | Knuutila et al. | |
| 2004/0153823 A1* | 8/2004 | Ansari | 714/38 |
| 2008/0235536 A1 | 9/2008 | Benedek | |

OTHER PUBLICATIONS

"Crashes in MS Office when Acrobat is present", Jan. 2002, rdpslides.com.*

Rich the Tweak, "Troubleshooting Audio Performance", Mar. 2002, tweakheadz.com.*

"Description and Availability of Internet Explorer Error Reporting Tool", Retrieved From:http://web.archive.org/web/20021201024116/http://support.microsoft.com/default.aspx?scid=kb;en-us;q276550, (2003), 4 pages.

"Final Office Action", U.S. Appl. No. 12/133,337, (Oct. 14, 2010), 11 pages.

"Macromedia Flash Player 5.0 Causes an Error Message in Windows XP", http://support. microsoft.com/default.aspx?scid=KB;EN-US;q320219&, (Jul. 21, 2002), 2 pages.

"Microsoft Computer Dictionary, 5th Edition", *Microsoft Press*, 2002, (2002), p. 445.

"Microsoft Error Reporting", http://web.archive.org/web/20040207013043/http://watson.microsoft.com/dw/103.3/dcp.asp?SD=GN&LN=EN-US&gssnb=1, (2003), 4 pages.

"Non-Final Office Action", U.S. Appl. No. 12/133,337, (May 6, 2011), 8 pages.

"Non-Final Office Action", U.S. Appl. No. 12/133,337, (Jun. 28, 2010), 6 pages.

"Notice of Allowance", U.S. Appl. No. 12/133,337, (Sep. 30, 2011), 4 pages.

"Windows 95/98/2000/NT MS Word 97-2000 Document Viewer: Installation and Getting Started", *University of Virginia*, Retrieved from:http://web.archive.org/web/20050319111242/www.itc.virginia.edu/desktop/docs/cdrom/windows 95 98 nt/word 97 viewer/, (Feb. 21, 2001), 5 pages.

Arlat, Jean et al., "Dependability of COTS Microkernel-Based Systems", *IEEE Transactions on Computers 51(2):*, (Feb. 2002), pp. 138-163.

Oh, N. et al., "Control Flow Checking by Software Signatures", *IEEE Transactions on Reliability 51(1)*, (03/02), pp. 111-122.

Smith, R.F. "Internet Explorer Security Options, Part 2", Windows IT Pro, retrieved from: http://www.windowsitpro.com/article/activex/internet-explorer-security-options-part-2, (Apr. 12, 2001), 3 pages.

Smith, Richard E., "Cost Profile of a Highly Assured, Secure Operating System", *AMC Transactions on Information and Systems Security 4(1)*;rick smith@securecomputing.com, (Feb. 2001), 24 pages.

* cited by examiner

| APPLICATION NAME | APPLICATION VERSION | LIBRARY NAME | LIBRARY VERSION | LIBRARY OFFSET | EXCEPTION CODE |
|---|---|---|---|---|---|
| INTERNET EXPLORER | 6.0 | DLL A | 1.0 | 32 | STATUS ACCESS VIOLATION |
| INTERNET EXPLORER | 5.5 | DLL B | 2.1 | 256 | STATUS STACK OVERFLOW |
| INTERNET EXPLORER | 5.0 | DLL C | 1.01 | 512 | STATUS INVALID OPCODE |
| INTERNET EXPLORER | 5.5 | DLL D | 1.1 | 8 | OBJECT NOT INITIALIZED |

Fig. 4.

DETECTING BROWSER FAILURE

RELATED APPLICATION

This application is a continuation of and claims priority to U.S. patent application Ser. No. 12/133,337, filed Jun. 4, 2008, entitled "System and Method of Preventing a Web browser Plug-In Module from Generating a Failure," which in turn is a continuation of U.S. Pat. No. 7,398,433, the disclosures of which are incorporated in their entirety by reference herein.

BACKGROUND

One of the reasons the World Wide Web (or Web) is so popular is the ability of users to publish and interact with rich content. Examples of rich content include Web sites with both foreground and background images, multiple colors, interactive controls, fonts, audio clips, code modules, and animation. Users generally interact with rich content using Web browsers. Web browsers display rich content from Web sites to the user and permit the user to interact with rich content using input devices such as a keyboard or a mouse. Many software applications generate professional looking rich content that may be displayed on Web sites. These applications enable a user to create rich content including images, fonts, sounds, animation, and user-interactive controls. As more users discover the rich content available through various networks, such as the Internet, the stability of Web browsers is increasingly more important.

Web browsers generally display "standard" rich content: rich content containing those features defined according to some standard. HTML (hypertext markup language), XHTML (extensible hypertext markup language), and XML (extensible markup language) are examples of rich content formats that have been "standardized" by the World Wide Web Consortium (the W3C), a widely recognized standardization body for developing interoperable technologies for information exchange, commerce, and communication on the Web.

Before they become standards according to the W3C, or some other standardization body, proprietary or specialized features developed within the foregoing (and other) formats are deployed on Web sites. Some of these new features may never be standardized. For these cases, most Web browsers have been developed to accept plug-in modules. In general, plug-in modules are software extensions to an application, specifically, in this case, a Web browser such as Microsoft's Internet Explorer®. A user will typically install a plug-in module into a specific directory location associated with a Web browser. This will typically be a known location that the Web browser searches when starting up. If the plug-in module is properly located, the Web browser will interact with the plug-in module to extend or enhance the Web browser's abilities, including displaying nonstandard, proprietary features stored in a Web file.

Among many other items, existing Web browsers support plug-in modules that provide rich content such as ActiveX controls, browser helper objects, toolbar extensions, and the like. The above-described rich content may be provided by individuals or organizations with the desire to add functionality to an existing Web browser (i.e., third parties). Combining these features—Web browsers adapted to function as display modules having plug-in extensibility—creates an extremely adaptable and powerful display and extensibility mechanism. Unfortunately, plug-in modules, if designed incorrectly, may cause a Web browser to "crash" or fail. As known to those skilled in the art and others, failures are frustrating to users and may result in the loss of information. Typically, a failure occurs when a program performs an operation that is not permitted by an operating system.

A substantial portion, if not almost all, of the failures in existing Web browsers are caused by errors in plug-in modules. To the user, the cause of the failure is unknown. Some users mistakenly believe that the failure is caused by an error in the Web browser and continue to use plug-in modules created by third parties, resulting in continued instability. Obviously, the usability of the Web browser is reduced when the user does not know the cause of a failure and is unable to prevent future failures. Existing Web browsers do not identify the cause of a failure or assist users in preventing future failures. Instead, Web browser providers receive reports from users who experience failures and from these reports identify the cause of the failure. If a plug-in module caused the failure, the Web browser provider may either provide an update that disables the plug-in module or request an update from the third party that created the plug-in module.

As mentioned above, the current Web browser failure prevention paradigm is a reactionary system, i.e., the Web browser is updated to prevent failures only after failures are reported. Furthermore, the Web browser update cycle is an extremely costly process for the Web browser provider, and ultimately for consumers of the Web browser.

In light of the above-identified problems, it would be beneficial to computer users, both in terms of convenience and in terms of cost-effectiveness, to have a Web browser that identifies plug-in modules that cause failures. Further, it would be beneficial to computer users to have a Web browser that allows users to disable or update plug-in modules that cause failures. Embodiments are directed to providing such a Web browser.

SUMMARY

Embodiments are generally directed to improving the stability of a Web browser by identifying plug-in modules that cause failures and permitting users to disable or update problematic plug-in modules. More specifically, implementations provide a method that analyzes data in memory at the time of a failure and compares this data to a database of known failures. If a plug-in module to a Web browser is identified as the source of a failure, options are presented to the user, who may update the plug-in module with code that does not produce a failure or disable the plug-in module altogether.

In implementations, a utility program is launched from inside a Web browser. The utility program displays plug-in modules installed with a Web browser and permits users to disable/enable the plug-in modules. Also, the utility program provides information about the plug-in modules, such as whether updates are available and where an update may be obtained.

Embodiments include a system that includes a client computing device, a Web browser, a plug-in module, a Web browser window, an application processing module, a content display module, an event listening module, a failure prevention module, and a failure signature database. The system displays rich content to users including rich content generated by plug-in modules. If a failure occurs and a plug-in module is identified as the source of the failure, options are presented to the user for preventing failures in the future.

BRIEF DESCRIPTION OF THE DRAWINGS

The foregoing aspects and many of the attendant advantages of one or more embodiments will become more readily appreciated as the same become better understood by reference to the following detailed description, when taken in conjunction with the accompanying drawings, wherein:

FIG. 4 is a table of failure signatures that illustrates a representative section of a failure signature database.

DETAILED DESCRIPTION

Overview

Implementations are generally directed to improving the stability of a Web browser by identifying plug-in modules that cause failures and permitting users to update or disable the problematic plug-in modules. In one embodiment, a failure in a computing device is analyzed, and a mechanism for preventing failures in the future is provided. More specifically, a method analyzes a failure by collecting data in memory and comparing the collected data to a database of known failures. If a plug-in module is identified as the source of the failure, options are presented to the user, who may update the plug-in module with code that does not produce a failure or disable the plug-in module altogether.

Although embodiments are described in the context of a Web browser such as Microsoft's Internet Explorer®, those skilled in the relevant art and others will appreciate that embodiments are applicable to other programs that make use of third-party plug-in modules. The following description first provides an overview of a system in which embodiments may be implemented. Then a method that identifies the source of a failure and presents users with options for preventing failures in the future is described. The illustrative examples provided herein are not intended to be exhaustive or to limit embodiments to the precise forms disclosed. Similarly, any steps described herein may be interchangeable with other steps, or several combinations of steps, in order to achieve the same result. Accordingly, the described embodiments should be construed as illustrative in nature and not as limiting.

Figure 1:
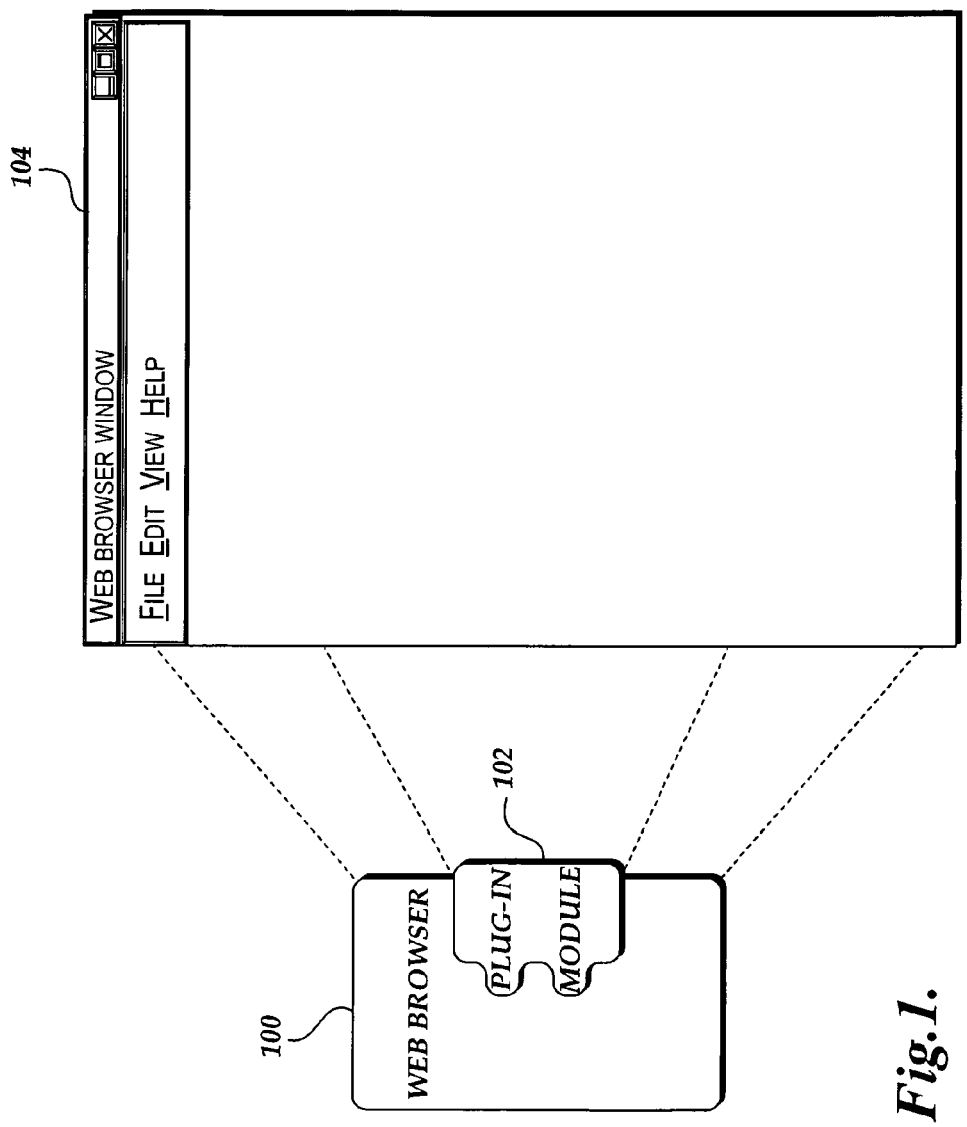
FIG. 1 is a pictorial depiction of a Web browser including a plug-in module and a Web browser window that illustrates the process of displaying rich content to users in accordance with one or more embodiments.

FIG. 1 is a pictorial depiction of a Web browser 100 configured according to one or more embodiments. For ease of illustration, FIG. 1 does not show the components of the Web browser 100. FIG. 1 does show a plug-in module 102 that extends the functionality of the Web browser 100 when displaying rich content in a Web browser window 104. As described above, rich content may be in a standardized format such as HTML, XHTML, or XML. Conversely, rich content may be in a non-standardized format such as ActiveX controls, browser helper objects, toolbar extensions, and the like. Although this example illustrates a Web browser with a single plug-in module, those skilled in the art and others will appreciate that additional plug-in modules may be included.

Developers that create plug-in modules utilize a programming interface available from existing operating systems such as the Component Object Model ("COM") programming interface. A programming interface (or, more simply, interface) may be viewed as any mechanism, process, or protocol for enabling one or more segment(s) of code to communicate with, or access the functionality provided by, one or more other segment(s) of code. Alternatively, a programming interface may be viewed as one or more mechanism(s), method(s), function call(s), module(s), object(s), etc., of a component in a system capable of communicating with one or more mechanism(s), method(s), function call(s), module(s), etc., of other component(s).

The term "segment of code" is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether the code segments are located on the same or different machines or distributed across multiple machines.

Objects such as COM objects are segments of code that add functionality to existing programs (i.e., objects are used to create plug-in modules). Typically, objects are self-contained, language-neutral code that are identified with a unique identifier (hereinafter "class identifier"). When an object such as plug-in module 102 is installed on a computing device, the object's class identifier is stored in the system registry. As known to those skilled in the art and others, the system registry is a database used to store settings, options, and preferences regarding the operation of a computing device including settings for all the hardware, software, and user preferences. An object is not functional unless certain information including the object's class identifier is contained in the system registry. As known to those skilled in the art, a system registry is one illustrative example of a database used to store settings, options, and preferences regarding the operation of a computing device.

In addition to the class identifier, the system registry also stores references to libraries, such as dynamically linked libraries (hereinafter "DLLs"), which contain an object's definitions, code segments, and data. Typically, executable programs like plug-in module 102 are constructed by combining segments of source code obtained from different locations. The segments may be combined before compiling and then compiled into an executable program. Alternatively, when a segment of source code is frequently used, the segment can be compiled separately to produce a library, and to combine the library with other libraries when the functionality of the library is actually needed. DLLs are one example of libraries of compiled code. Libraries that satisfy function calls to a programming interface are stored in the system registry with the class identifier of the calling object. As described below with reference to FIG. 3, embodiments are configured to use the contents of the registry to determine whether a plug-in module used to extend the functionality of a Web browser is the source of a failure.

Figure 2:
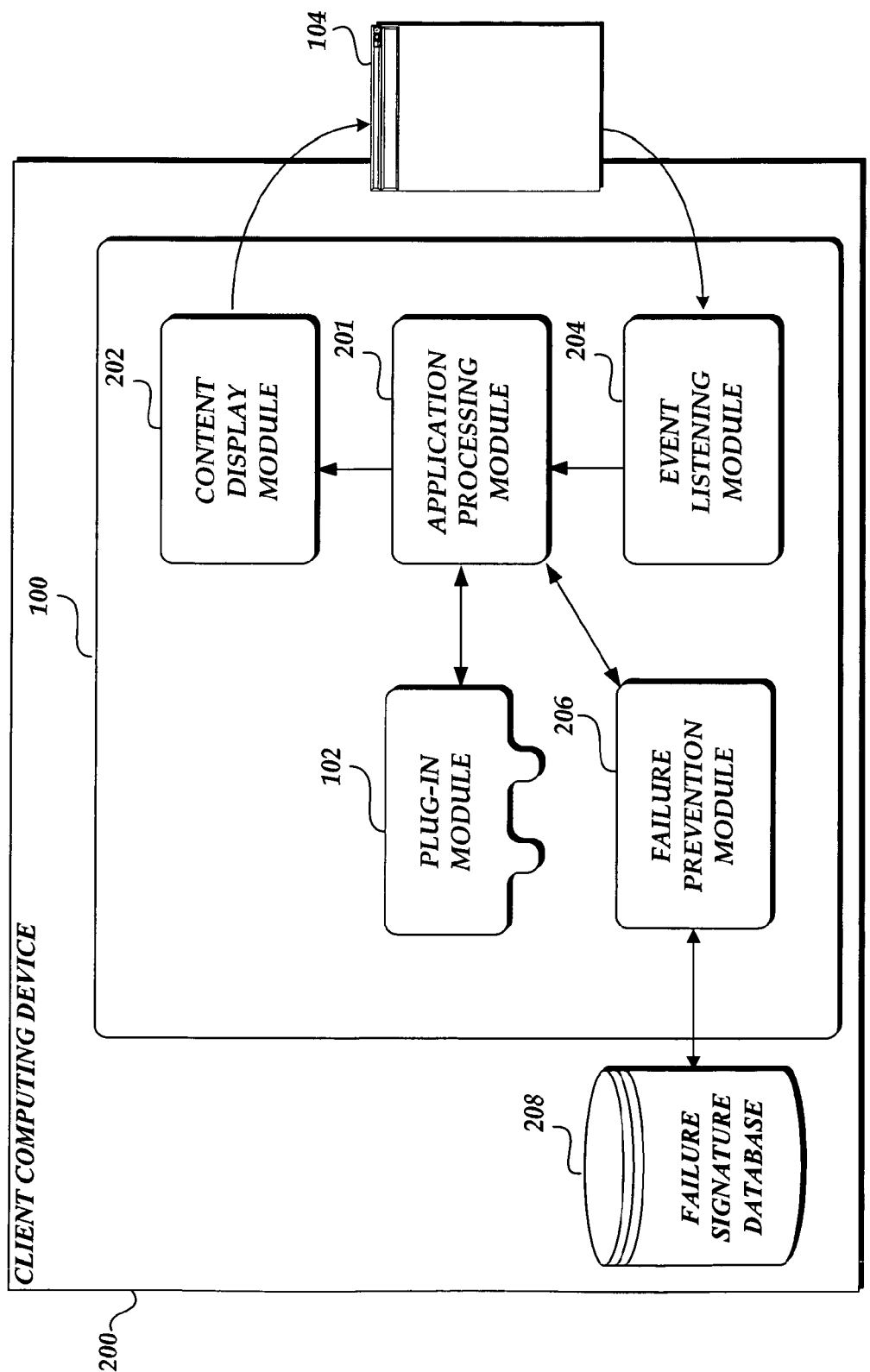
FIG. 2 is a pictorial diagram of the Web browser of FIG. 1, including components contained therein and a client computing device suitable to implement one or more embodiments.

FIG. 2 is a block diagram of a client computing device 200 and components of an exemplary Web browser 100 suitable for hosting plug-in modules and for displaying plug-in supplied content in a Web browser window 104. Client computing device 200 may be any one of a number of computing devices including, but not limited to, personal computing devices, hand-held computing devices, server-based computing devices, personal digital assistants, mobile telephones, stand-alone memory devices, electronic devices having some type of memory, and the like.

For ease of illustration, FIG. 2 does not show the typical components of client computing device 200 such as a keyboard, a mouse, a printer, or other input/output devices, a central processing unit, a display, etc. Also, FIG. 2 does not show other computing devices that may be connected to client computing device 200. Those skilled in the art will appreciate that plug-in modules are used to extend the functionality of a Web browser 100. Microsoft's Internet Explorer® is one example of a Web browser that supports plug-in modules. The Web browser 100 includes an application processing module 201 that is the processing core of the Web browser 100. Because Web browsers are created to perform a variety of tasks, the application processing module 201 is only discussed in relation to this application in a generic fashion. The application processing module 201 carries out the general functions of the Web browser 100 and cooperates with the plug-in module 102 to extend the functionality of the Web browser 100.

The plug-in module 102 communicates and exchanges information with the application processing module 201 in order to cooperatively carry out the added functionality provided by the plug-in module 102. Additionally, the plug-in module 102 may have related content to display to a user apart from the cooperative processing with the application processing module 201.

FIG. 2 also illustrates that the Web browser 100 includes a content display module 202. The content display module 202 generates the Web browser window 104 and sends content processed by the application processing module 201 to the Web browser window 104. The content display module 202 then causes the Web browser window 104 to display rich content.

The Web browser 100 shown in FIG. 2 also includes an event listening module 204. The event listening module 204 listens for event messages generated by the user from Web browser window 104. The event listening module 204 may listen for nothing more than a notice of closing of the Web browser window 104. Alternatively, the event listening module 204 may receive event messages generated from controls embedded in the Web browser window 104 by plug-in module 102. To receive event messages, also known as callbacks, from controls embedded in content displayed in Web browser window 104, the plug-in module 102 must implement a small, well-defined set of routines. As illustrated in FIG. 2, event messages between the Web browser window 104 and the plug-in module 102 are passed by the application processing module 201.

As will be understood from the following description, embodiments can be implemented by a set of software-generated routines located in a failure prevention module 206. As illustrated in FIG. 2, the failure prevention module 206 is interconnected and able to communicate with the application processing module 201 and a failure signature database 208. As described in more detail below, the application processing module 201 notifies the failure prevention module 206 when a failure occurs. Then the failure prevention module 206 searches the failure signature database 208 and determines if a plug-in module such as plug-in module 102 caused the failure. If a plug-in module caused the failure, the failure prevention module 206 presents the user with options for updating or disabling the plug-in module.

As known to those skilled in the art, FIG. 2 is a simplified example of a system that supports plug-in modules. Actual embodiments of a Web Browser will have additional components not illustrated in FIG. 2 or described in the accompanying text. Also, FIG. 2 shows one component architecture for supporting plug-in modules, and other component architectures that implement embodiments may be utilized.

Figure 3:
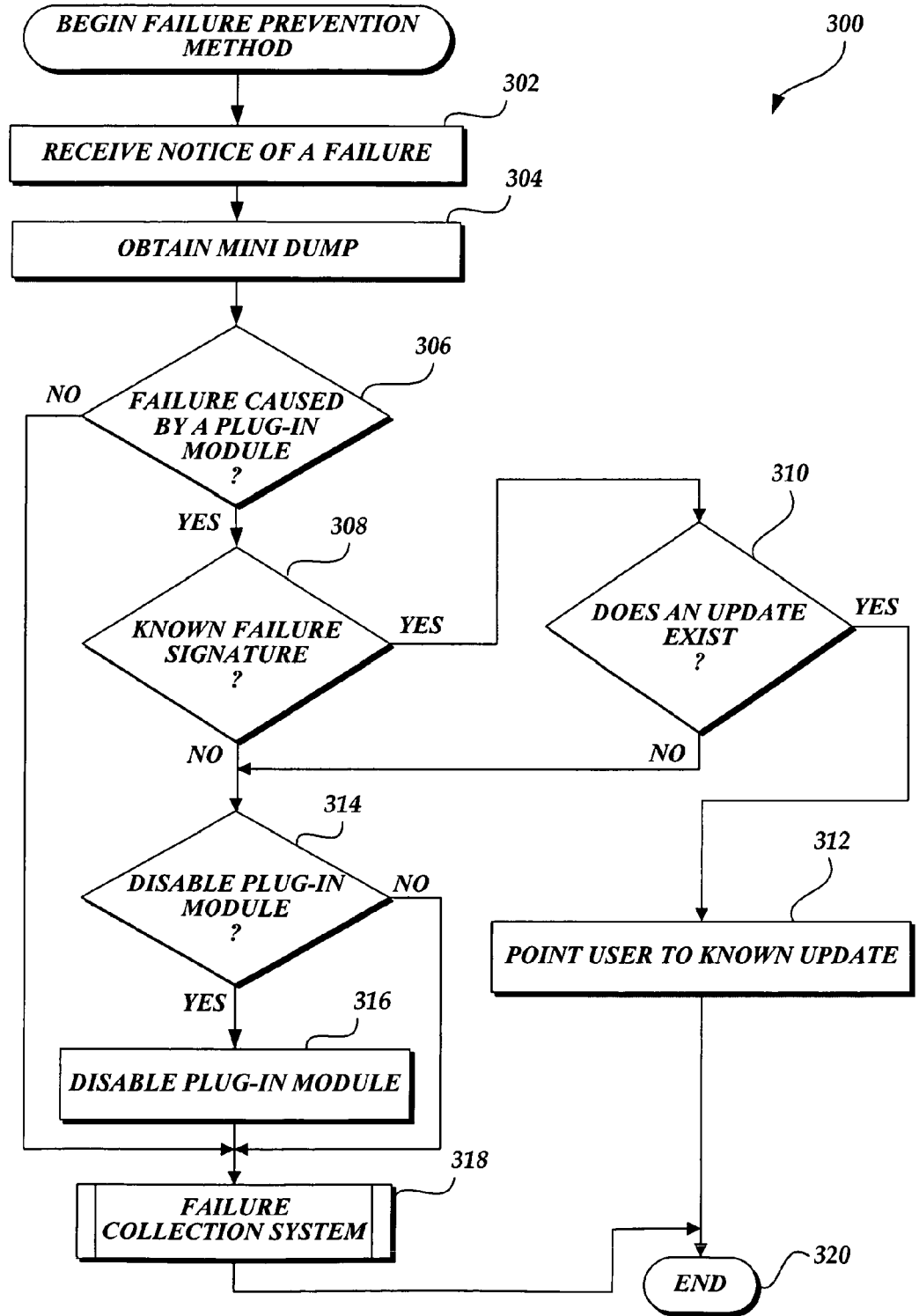
FIG. 3 is a flow diagram illustrating a method that analyzes failures in a Web browser and provides a mechanism for preventing failures in the future in accordance with one or more embodiments.

FIG. 3 is a flow diagram illustrating one exemplary embodiment of a failure prevention method 300 formed in accordance with one or more embodiments and suitable for implementation as computer-executable instructions stored on a computer-readable medium. In summary, the failure prevention method 300 receives a notice when a Web browser fails. In response to receiving the notice, the method analyzes a "minidump" of the failure identifying any plug-in modules that caused the failure. The failure prevention method 300 differentiates between failures caused by plug-in modules from failures caused by other segments of code. For those failures caused by plug-in modules, users are given options for preventing future failures. With continuing reference to FIGS. 1-2 and the accompanying descriptions, the exemplary failure prevention method 300 illustrated in FIG. 3 will now be described.

The failure prevention method 300 begins at block 302 where the method receives a notice that a Web browser failed. As known to those skilled in the art and others, a notice that a failure occurred may be generated by the use of conventional functions available from existing operating systems such as a Microsoft® operating system, UNIX operating system, LINUX™ operating system, and the like.

Upon receipt of a notice that a Web browser failed, the failure prevention method 300 proceeds to block 304 where the method obtains a minidump file (hereinafter "minidump") that recorded the memory contents of the computing device at the time of the failure. Many operating systems generate a full crash dump or core dump files (hereinafter "crash dump") when the operating system recognizes a failure. Traditionally, when generating a crash dump, the operating system switches to a minimal mode of operation and attempts to save memory contents to a file on disk. A developer may subsequently use the saved information to analyze the failure, for example, offline at a later date.

Generally, a complete crash dump is a record of all memory present in a computing device saved to a file. A complete crash dump provides developers with access to data structures relating to the state of different components at the time of the crash. The large size of complete crash dumps makes it cumbersome to isolate the computer code that caused the failure because a vast amount of system information must be read. Also, transmission of large files over a network consumes resources and time, reducing the convenience of remote failure prevention systems. Therefore, mechanisms have been developed to generate a minidump, which is an abbreviated record of a crash dump. A detailed description of creating a minidump from a crash dump is found in commonly assigned U.S. Pat. No. 6,681,348, entitled CREATION OF MINI DUMP FILES FROM FULL DUMP FILES, issued Jan. 20, 2004, the content of which is expressly incorporated herein by reference.

After the minidump is obtained, the failure prevention method 300 proceeds to decision block 306 where the method determines if the failure was caused by a plug-in module to a Web browser.

To determine if a failure was caused by a plug-in module to a Web browser, the failure prevention method 300 compares data available in the minidump obtained at block 304 with data contained in a database such as the system registry. As described above with reference to FIG. 1, developers that create plug-in modules utilize programming interfaces provided by existing operating systems such as the COM programming interface. When an object, such as a plug-in module, is installed on a computing device 200, a database such as the system registry associates the object's class identifier with libraries used by the object and the application that the object interacts with to extend. When an object such as a plug-in module executes, libraries used by the object are loaded into memory. Since developers each build libraries designed to implement their individual plug-in modules, the set of libraries used by an object is unique.

In the event of a failure, the memory contents of the computing device 200, including the library executing at the time of the failure, is recorded in the minidump. Embodiments can identify the object (i.e., plug-in module) that caused the failure by obtaining the name and version of the library that was executing at the time of the failure from the minidump. Once the name and version of the library that produced the failure are known, the system registry is searched. If an object is identified in the system registry as both using the library that produced the failure and extending the functionality of a Web browser, then the failure was caused by a plug-in module to a Web browser.

If the failure was not caused by a plug-in module that extends the functionality of a Web browser, the failure prevention method 300 proceeds to block 318 described in detail below. Conversely, if the failure was caused by a plug-in module that extends the functionality of a Web browser, the failure prevention method 300 proceeds to decision block 308 where the method determines if the minidump reveals a known failure signature.

To determine if a failure reveals a known failure signature at block 308, the failure prevention method 300 extracts data from the minidump and compares it to information contained in the failure signature database 208. As described above, the minidump identifies the library that was executing at the time of the failure. Among other data, the minidump also stores the application name, application version, library version, library offset, and exception code generated by the operating system when the failure occurred. As described in more detail below, data is extracted from the minidump to generate a failure signature and compared to a database of known failure signatures. If the failure signature extracted from the minidump matches a known failure signature, the user is prompted for instructions on updating or disabling the object (i.e., plug-in module) that generated the failure.

For illustrative purposes, a representative section of failure signature database 208 (FIG. 2) is illustrated in FIG. 4. In this example, the failure signature database 208 contains a plurality of database records stored in a table 400, where each record is contained in a row of the table. Each record contains a number of database fields that, in this example, are identified as APPLICATION NAME 402, APPLICATION VERSION 404, LIBRARY NAME 406, LIBRARY VERSION 408, LIBRARY OFFSET 410, and EXCEPTION CODE 412. In each record, the APPLICATION NAME 402 and APPLICATION VERSION 404 fields store the application name and version that was executing at the time of the failure. The LIBRARY NAME 406 and LIBRARY VERSION 408 fields store the name and version number that collectively identify the LIBRARY that generated the failure.

The LIBRARY OFFSET 410 field stores a numeric value representative of the code location in the library where the failure occurred. The EXCEPTION CODE 412 field stores exception code generated by the operating system in response to the failure. As known to those skilled in the art, when a failure occurs, an operating system generates exception code that identifies the specific type of failure that occurred. The information contained in each record including database fields 402, 404, 406, 408, 410, and 412 collectively form a failure signature that is used by one or more embodiments to identify plug-in modules that cause failures. Although this example illustrates one database table and failure signature having specific attributes, those skilled in the art will appreciate that embodiments may operate with more or fewer than all of the listed attributes. In addition, those skilled in the art will appreciate that other fields may be added to accommodate other embodiments.

Returning to FIG. 3, at decision block 308, the failure prevention method 300 obtains the name, version, and offset of the library that was executing at the time of the failure. As described above with reference to FIG. 4, the library offset is a numeric value that represents the code location in the library where the failure occurred. Also, the exception code generated by the operating system in response to the failure is obtained from the minidump at block 308. Since searching a file (i.e., the minidump) for information about a library and exception code is known in the art, further description of such process is not described here.

Once the name and version of the library that produced the failure are known, the system registry is searched for the object (i.e., plug-in module) that uses the library. Once the object that uses the library is identified, the application name and version that the object interacts with to extend are also obtained from the system registry. The information identified at block 308 including the application name, application version, library name, library version, library offset, and exception code are collected to form a failure signature. The failure signature is compared with failure signatures stored in a database such as failure signature database 208.

If the current failure signature does not match a known failure signature, the failure prevention method 300 proceeds to block 314 described below. Conversely, if the failure signature generated at block 308 does match a known failure signature, the failure prevention method 300 proceeds to decision block 310 where the method 300 determines if an update exists to the plug-in module that generated the failure. Typically, plug-in modules are created and updated by third parties (i.e., entities other than the Web browser provider). Information regarding updates to plug-in modules is maintained and queried from a database. Since querying a database for the type of data described above is generally known in the art, such a process is not described here.

If an update to a plug-in module does not exist, the failure prevention method 300 proceeds to block 314 described below. Conversely, if an update does exist, the failure prevention method 300 proceeds to block 312 where the user is provided with information regarding the update. In an exemplary embodiment, a prompt informs the user that a plug-in module that extends the functionality of a Web browser caused a failure. Also, the user is provided with information regarding where an update may be obtained, such as a Web site or distribution center. Then the failure prevention method 300 proceeds to block 320 where it terminates.

At block 314, the user is provided with information regarding the failure of a plug-in module. In an exemplary embodiment, a prompt displays a message to the user indicating that a plug-in module that extends the functionality of a Web browser was the source of a failure. The message also prompts the user for instructions on handling the failure such as whether the plug-in module should be disabled. Those skilled in the art will recognize that a message may be generated and displayed to the user with techniques known to those skilled in the art. If the user does not want to disable the plug-in module, the failure prevention method 300 proceeds to block 318 described in detail below.

If the user does want to disable the plug-in module, the routine proceeds to block 316 where the plug-in module that generated the failure is disabled. As described above, plug-in modules are objects with entries in a database such as the system registry. When a Web browser begins execution, the system registry is traversed so that plug-in modules that extend the functionality of the Web browser may be loaded into memory. In an exemplary embodiment, plug-in modules are disabled by changing or eliminating entries in the system registry that reference the plug-in module. As known to those skilled in the art and others, a plug-in module may be disabled using other techniques and methods generally known in the art, and the example described above should be construed as exemplary, not limiting.

At block 318, an existing failure collection system is notified of the failure and the minidump obtained at block 304 is collected in a repository on a remote computing device. A detailed description of an existing failure collection system suitable to store a minidump may be found in commonly assigned U.S. Pat. No. 6,629,267, entitled METHOD AND SYSTEM FOR REPORTING A PROGRAM FAILURE, issued Sep. 30, 2003, the content of which is expressly incorporated herein by reference. Continued collection of failure data assists developers in updating systems designed to prevent failures such as the failure prevention module 206. Then the failure prevention method 300 proceeds to block 320 where it terminates.

The failure prevention method 300 described with reference to FIG. 3 above describes an embodiment where a plug-in module is updated in response to a failure. Another embodiment includes a utility program launched from a menu item in a Web browser. The utility program may be implemented with a graphical user interface with any one of a number of methods known in the art. The utility program displays plug-in modules installed on a computing device, such as computing device 200, and permits users to disable the displayed plug-in modules.

As described above, plug-in modules may be disabled by changing or eliminating entries in the system registry that reference the plug-in modules. Also, the utility program allows users to obtain information about the displayed plug-in modules such as whether an update exists and where an update may be obtained. Although this example illustrates one utility program having specific attributes, those skilled in the art will appreciate that the utility program may have additional attributes.

Figure 5:
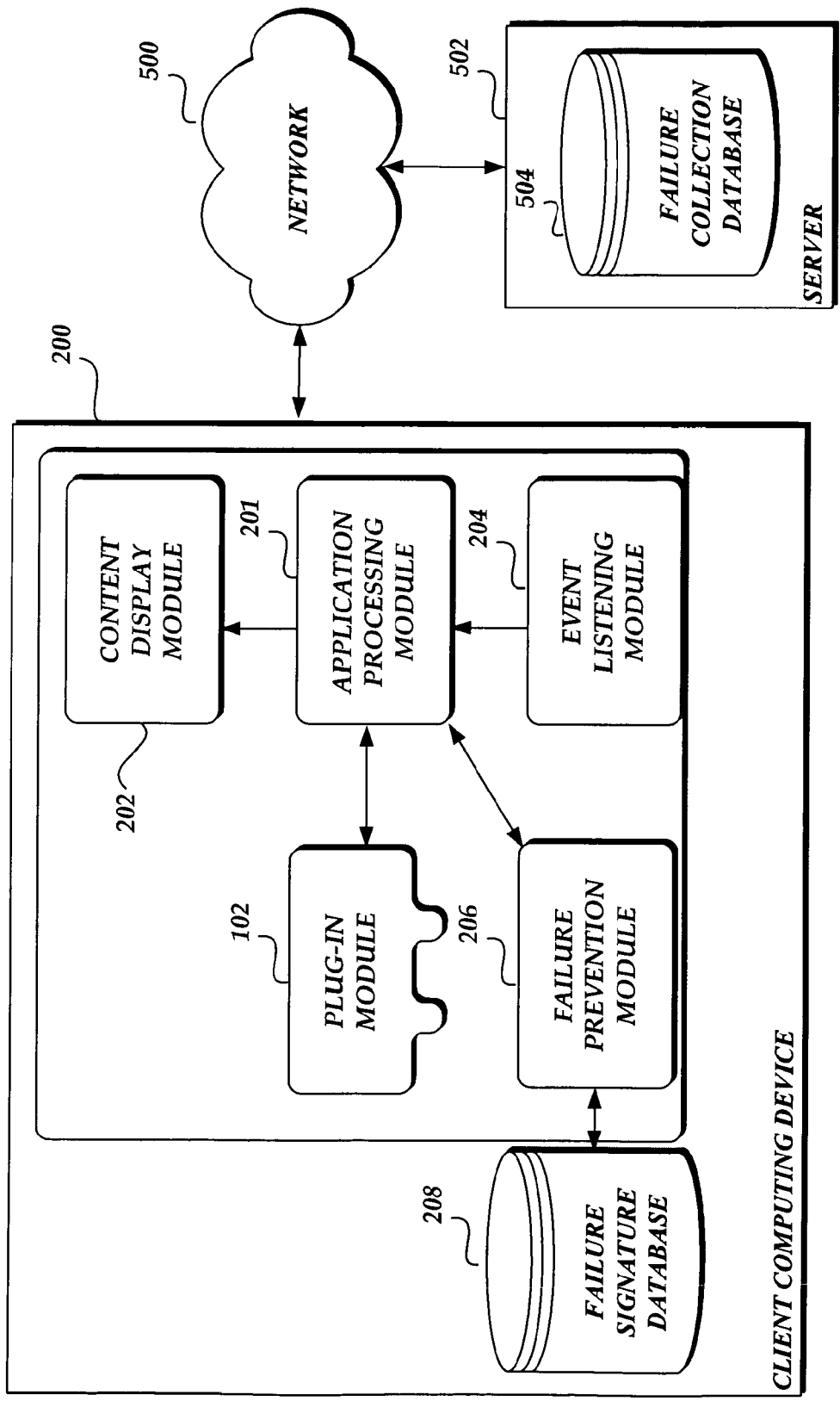
FIG. 5 is a pictorial diagram of a network, including a client computing device and a server computing device that provide a mechanism for preventing failures in plug-in modules in accordance with one or more embodiments.

FIG. 5 illustrates a client computing device 200 of the type illustrated in FIG. 2 and described above connected via a network 500 to failure collection database 504 located in a remote server computing device 502. More specifically, like FIG. 2, the client computing device 200 includes a Web browser 100, a plug-in module 102, a Web browser window 104, an application processing module 201, a content display module 202, an event listening module 204, a failure prevention module 206, and a failure signature database 208. The network 500 connects the client computing device 200 and the server computing device 502. The network 500 may be any one of a variety of networks using any one of a variety of protocols known to those skilled in the relevant art. Further, as will be readily understood by those skilled in the relevant art and others, FIG. 5 is illustrative and should not be construed as limiting. More or fewer computing devices may be connected to the network 500.

As illustrated in FIG. 5, the software-implemented routines employed by one or more embodiments may be stored on a client computing device such as client computing device 200. As a result, embodiments can be functional in stand-alone computing devices not connected to a network. However, the use of a Web browser inherently suggests that a computing device is connected to a network such as the Internet. Consequently, the software-implemented routines employed by one or more embodiments may be stored on a remote computing device such as server computing device 502 or any other computing device operative to transmit content to network 500.

A remote computing device such as server computing device 502 may be used for several purposes. The failure collection system described above with reference to FIG. 3 at block 318 may transmit data to a database such as the failure collection database 504 that assists developers in keeping failure prevention systems updated. For example, the server computing device 502 may be used to update the failure signature database 208 so that current information regarding updates to plug-in modules may be disseminated to users. As known to those skilled in the art, a remote computing device may be used for purposes in addition to the exemplary uses described above.

Implementations of the modules and techniques described herein may be stored on or transmitted across some form of computer-readable media. The computer-readable media may include a variety of media that may be accessed by the client computing device 200. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media does not include signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the client computing device 200, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

While embodiments have been illustrated and described, it will be readily appreciated by those skilled in the art and others that, within the scope of the appended claims, various changes can be made therein without departing from the spirit and scope of the disclosed embodiments.

What is claimed is:

1. One or more computer-readable storage media storing computer-executable instructions which, when executed by a computing device, cause the computing device to implement at least one module configured to:
   receive an indication of a failure associated with the computing device, the indication including a signature for the failure;
   search a failure signature database to determine whether the signature for the failure matches a known failure signature;
   ascertain that the signature matches a known failure signature associated with a plug-in module;
   determine whether an update is available for the plug-in module;
   in an event that the update is available, cause a notification that the update is available to be presented; and
   in an event that the update is not available, cause a notification to be presented that is selectable to cause the plug-in module to be disabled.

2. One or more computer-readable storage media as recited in claim 1, wherein the failure comprises a failure associated with a plug-in module for a web browser.

3. One or more computer-readable storage media as recited in claim 1, wherein the signature for the failure includes an application name and an application version associated with the failure.

4. One or more computer-readable storage media as recited in claim 1, wherein the signature for the failure includes a library name and a library version associated with the failure.

5. One or more computer-readable storage media as recited in claim 1, wherein the signature includes an application name and an exception code associated with the failure.

6. One or more computer-readable storage media as recited in claim 1, wherein the at least one module is configured to ascertain that the signature matches a known failure signature associated with a plug-in module by matching the signature to the known failure in the failure signature database.

7. One or more computer-readable storage media as recited in claim 1, wherein the at least one module is configured to cause at least one of the notification that the update is available or the notification that is selectable to cause the plug-in to be disabled to be presented in a graphical user interface that lists multiple different plug-ins and enables each of the multiple different plug-ins to be disabled.

8. One or more computer-readable storage media as recited in claim 7, wherein the notification that the update is available includes an indication of where the update may be obtained.

9. A method implemented by a computing device, the method comprising:
   receiving an indication of a failure associated with an application;
   obtaining information about the failure from a record of memory contents of the computing device at a time of the failure;
   searching a database of configuration information for the computing device with the information about the failure to ascertain whether the failure is associated with a plug-in module;
   ascertaining that the information about the failure matches a known failure signature associated with a plug-in module;
   determining that an update is not available for the plug-in module; and
   causing a notification to be presented that is selectable to cause the plug-in module to be disabled.

10. A method as recited in claim 9, wherein the information about the failure comprises a name and a version indicator for a library that was executing at the time of the failure.

11. A method as recited in claim 9, further comprising determining, responsive to said searching, that the plug-in module is for a web browser.

12. A method as recited in claim 9, further comprising causing the notification to be presented in a graphical user interface that lists multiple different plug-in modules and that enables each of the multiple different plug-in modules to be disabled.

13. A method as recited in claim 9,
   wherein said ascertaining comprises comparing the information about the failure to a failure signature database to determine that the information about the failure matches a known failure signature for a plug-in module.

14. A method implemented by a computing device, the method comprising:
   receiving an indication of a failure of a plug-in module;
   obtaining information about the failure, the information including a library name and a library version associated with the failure;
   ascertaining that the information about the failure does not match a known failure signature associated with a plug-in module;
   causing the information about the failure to be stored in a database such that the database is searchable with the information to identify the plug-in module; and
   causing a notification to be presented that is selectable to cause the plug-in module to be disabled.

15. A method as recited in claim 14, wherein the information includes an identifier for an application associated with the plug-in module, and a version indicator for the application.

16. A method as recited in claim 14, further comprising causing status information for the plug-in module to be displayed, the status information indicating that an update for the plug-in module is not available.

17. A method as recited in claim 14, wherein the database includes information about multiple different failures associated with multiple different plug-in modules.

* * * * *